United States Patent
Walsh et al.

(10) Patent No.: US 10,061,578 B2
(45) Date of Patent: Aug. 28, 2018

(54) SYSTEM AND METHOD OF CONFIGURING A DATA STORE FOR TRACKING AND AUDITING REAL-TIME EVENTS ACROSS DIFFERENT SOFTWARE DEVELOPMENT TOOLS IN AGILE DEVELOPMENT ENVIRONMENTS

(71) Applicant: FMR LLC, Boston, MA (US)

(72) Inventors: Deborah Walsh, Holly Springs, NC (US); Richard Bugg, Morrisville, NC (US); John McDonough, Nahant, MA (US)

(73) Assignee: FMR LLC, Boston, MA (US)

( * ) Notice: Subject to any disclaimer, the term of this patent is extended or adjusted under 35 U.S.C. 154(b) by 157 days.

(21) Appl. No.: 15/232,870

(22) Filed: Aug. 10, 2016

(65) Prior Publication Data
US 2018/0046455 A1    Feb. 15, 2018

(51) Int. Cl.
*G06F 9/44* (2018.01)
*H04L 29/06* (2006.01)
*G06F 17/30* (2006.01)
*G06F 8/71* (2018.01)
*G06F 9/54* (2006.01)

(52) U.S. Cl.
CPC ........... *G06F 8/71* (2013.01); *G06F 9/542* (2013.01); *G06F 17/30312* (2013.01); *G06F 17/30589* (2013.01)

(58) Field of Classification Search
CPC ............. G06F 8/71; G06F 17/30563; G06F 17/30312; G06F 17/30589; G06F 9/542; G06Q 10/101; G06Q 10/0633; G06Q 30/0281; G06Q 30/0603; H04L 63/20
See application file for complete search history.

(56) References Cited

U.S. PATENT DOCUMENTS

| 8,819,617 | B1 | 8/2014 | Koenig et al. | |
| 8,965,957 | B2 * | 2/2015 | Barros | G06F 17/30563 709/203 |
| 9,130,826 | B2 * | 9/2015 | Nispel | H04L 43/04 |
| 9,813,447 | B2 * | 11/2017 | Rash | H04L 63/20 |

(Continued)

OTHER PUBLICATIONS

Bourimi et al., Non-Functional Requirements for Distributable User Interfaces in Agile Processes, Jul. 2014, 13 pages.*

(Continued)

*Primary Examiner* — Thuy Dao
(74) *Attorney, Agent, or Firm* — Proskauer Rose LLP

(57) ABSTRACT

Described herein are methods and systems for configuring a data store for tracking and auditing real time events associated with an end-to-end development lifecycle of a software product across different types of software development tools in Agile development environments. The data store stores vast numbers of records containing metadata that describe different types of real time events using different types of tools. Each record includes a set of defined fields that enable the records to be linked across the various tools and events throughout the end-to-end development lifecycle of a software product. Where the event is a compilation event detected in a compiler, the event metadata defining the compilation event is embedded in the compiled code as text for tracking of the development process even after the product is compiled into a binary form.

22 Claims, 8 Drawing Sheets

(56) References Cited

U.S. PATENT DOCUMENTS

| | | | |
|---|---|---|---|
| 9,959,100 B2* | 5/2018 | Straub | G06F 8/36 |
| 2007/0255529 A1* | 11/2007 | Biazetti | G06F 9/541 |
| | | | 702/186 |
| 2014/0250225 A1* | 9/2014 | Sellers | H04L 41/0213 |
| | | | 709/224 |
| 2015/0212812 A1* | 7/2015 | Tripathi | G06F 8/60 |
| | | | 717/120 |
| 2017/0069009 A1* | 3/2017 | Bursey | H04W 4/70 |

OTHER PUBLICATIONS

I. Kayes, Agile Testing: Introducing PRAT as a Metric of Testing Quality in Scrum, Mar. 2011, 5 pages.*

* cited by examiner

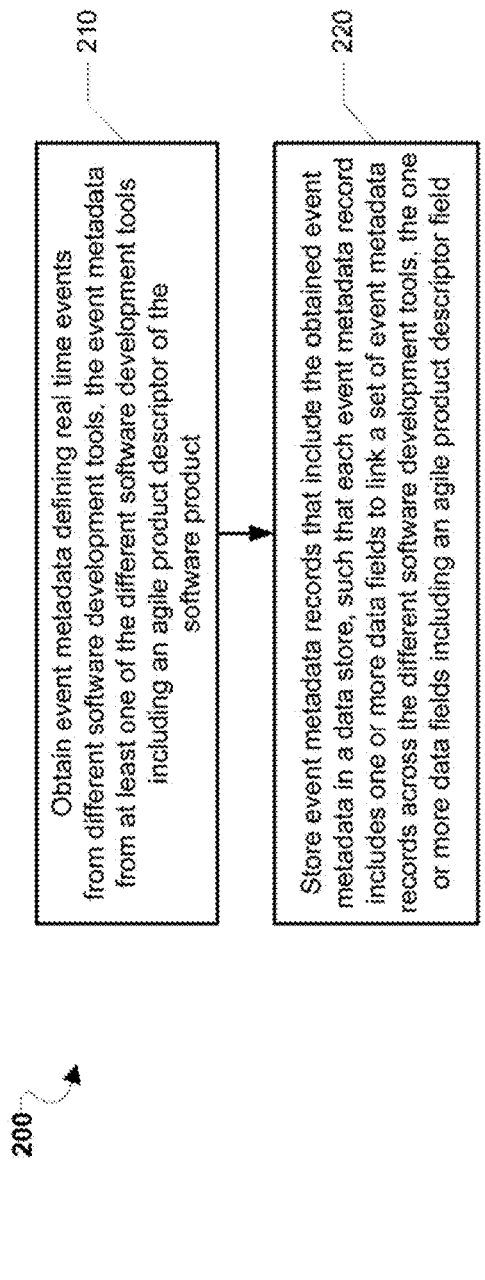

SYSTEM AND METHOD OF CONFIGURING A DATA STORE FOR TRACKING AND AUDITING REAL-TIME EVENTS ACROSS DIFFERENT SOFTWARE DEVELOPMENT TOOLS IN AGILE DEVELOPMENT ENVIRONMENTS

BACKGROUND

Project management involves, in part, planning, organizing, securing and/or managing resources to bring about the successful completion of a project with respect to specific project goals and objectives. Project managers can manage resources using, for example, a well-known Agile development approach. See., e.g., "Agile Software Development: A gentle introduction" at www.Agile-process.org. An Agile approach is characterized by factors such as relatively short time-frame intervals (often referred to as sprints or iterations), delivery of certain goals at the end of each iteration, and regular adaptation of requirements and designs in response to changing circumstances.

Under Agile development methods, a project can be organized into one or more features with each feature delivering a package of related functionalities that an end user generally expects to get all at once. In turn, each feature can be broken down into a collection of related stories with each story defining a particular functionality. Each story can be further decomposed into one or more tasks. In addition, a working feature or product can be produced at the end of a release, during which the feature or product is refined through successive iterations. Typically, each iteration involves a team working through a full development cycle including planning, designing and testing phases. Thus, Agile methods minimize overall risks by allowing a project to adapt to changes quickly.

Throughout the years, project management tools that have been created to more effectively organize and document the software development process. For example, project management tools have been designed to aid developers using the Agile method and to help larger and geographically distant teams interact over a network or the internet. For the sake of collaboration, consistency and effectiveness, such a management tool would actually require the consolidating and facilitating of project management, product management, customer management, programmers, testers, etc., into a single environment or management tool. Typically, however, several management tools are utilized by the manager, programmer or tester to accommodate their individual needs and there is no common management tool available that accommodates everyone's needs throughout the development process. Further still, different teams at different locations may choose to utilize different management tools that they are more familiar with or better suit their needs, which further complicate the overall management process of software development.

For example, numerous tools are available to track the development process. However, these tools lack an overall management capability and are only designed for a particular part or person in the development process. For example, the Jira™ issue/project tracking tool tracks issues, bugs, stories, project tasks, and other work items, whereas HP Quality Center (HP-QC)™ tracks test plans, test cases, test executions, defects, and root causes of defects. Likewise, Clear Case™ may track only the source code and Sonar™ only tracks the build and the code quality metrics. Service Manager™ tracks release tickets, change tickets, incidents reports, and overall problems. Other tools like CMDB™ track application registries, product lines, products, databases and servers, and Project Team™ tracks project team attributes, personnel, business deliverables, and product alignment. On more of the management side, PPMC™ tracks project resources and project financials. Thus, each of these tools does not have an overall management capability and are designed for specific parts of the development process.

Although some tools offer suites of management tools that interact, it can be difficult to get teams and/or data to migrate to a different tool or suite of tools, because people are creatures of habit and often managers, programmers, testers, etc. in the software development process often get familiar or comfortable with certain tools making it hard and unlikely for personnel to adjust. Often this leaves such new tools less used or worse unused and thus ineffective. Additionally, these suites are incapable of interacting with other third party tools. The inability to effectively manage the plurality of software development tools utilized across the development process, across various development teams, across various development tools and across geographically disperse locations not only interferes with the collaborative style of the Agile process but also breaks down the necessary oversight essential to effective project management via any software development methodology.

SUMMARY

Various embodiments are disclosed to configure a data store for tracking and auditing real time events associated with an end-to-end development lifecycle of a software product across different types of software development tools in Agile development environments. The data store may be configured to store vast numbers of records containing metadata that describe different types of real time events using different types of tools. Although the records may correspond to different tools, each record includes a set of defined fields that enable the records to be linked across the various tools and events throughout the end-to-end development lifecycle of a software product. Where the event is a compilation event detected in a compiler, the event metadata defining the compilation event may be embedded in the compiled code as text for tracking of the development process even after the product is compiled into a binary form for end-to-end development tracking and auditing of real time event.

Various embodiments of configuring a data store for tracking and auditing real time events across a plurality of different software development tools in an Agile development environment may include a processor of a server computing device obtaining event metadata defining real time events from different software development tools and storing event metadata records that include the obtained event metadata in a data store. The event metadata obtained from at least one of the different software development tools may include an Agile product descriptor. Each of the event metadata records may include one or more data fields to link a set of event metadata records across the different software development tools, including an Agile product descriptor field. In some embodiments, the Agile product descriptor field may include an identifier of a task, user story, feature, epic, portfolio, or any combination thereof. In some embodiments, the data fields used to link the set of event metadata records across the different software development tools may include a unique record key field, a timestamp field, a system identifier field, an event identifier field, a user identifier field, a defect identifier field, an asset identifier field, a multimedia field, a free field, or any combination thereof.

In some embodiments, the processor of the server computing device may receive a data query, determine a linked set of event metadata records across the plurality of different software development tools in the data store that satisfy the data query, and transmit the linked set of event metadata records for presentation at a client computing device. The event metadata records of the linked set may be linked based on values of the one or more data fields.

In some embodiments, the different software development tools may include a compiler and the event metadata may be embedded in compiled code stored in memory. To obtain the event metadata defining a compilation event in the compiler, the processor of the service computing device may access the compiled code stored in memory and extract the event metadata embedded in the compiled code.

In some embodiments, the different software development tools may include a coding tool and the event metadata obtained from the coding tool may include a source code segment generated using the coding tool. In some embodiments, storing the event metadata records may include storing the code segment in a free field of the event metadata records associated with the coding tool.

Various embodiments of configuring a data store for tracking and auditing real time events across a plurality of different software development tools in an Agile development environment may also include a processor of a software development tool detecting a real time event associated with development of a software product in the software development tool, obtaining event metadata that defines the real time event, and transmitting the event metadata for the detected real time event to the data store for storage in an event metadata record. The event metadata may include an Agile product descriptor of the software product associated with the real time event. The event metadata record may include one or more data fields to link the event metadata record associated with the software development tool to other event metadata records associated with the different software development tools. At least one of the data fields may include an Agile product descriptor field. In some embodiments, the Agile product descriptor field may include one or more identifiers of a task, user story, feature, epic, portfolio, or any combination thereof. In some embodiments, the data fields used to link the set of event metadata records across the different software development tools may include one or more of a unique record key field, a timestamp field, an event identifier field, a system identifier field, a user identifier field, a defect number field, an asset identifier field, a multimedia field, a free field, or any combination thereof.

In some embodiments, where the software development tool is a compiler, the method may include the processor detecting a compilation event in the compiler, obtaining event metadata that defines the compilation event, compiling source code into compiled code, such that the event metadata is embedded in the compiled code as text, extracting the event metadata embedded in the compiled code, and transmitting the extracted event metadata for the detected compilation event to the data store for storage in an event metadata record. The event metadata record may include one or more data fields used to link the event metadata record associated with the compiler to other event metadata records across the different software development tools.

Further embodiments include a computing device including a processor configured with processor-executable instructions to perform operations of the embodiment methods summarized above. Further embodiments include a non-transitory processor-readable storage medium having stored thereon processor-executable instructions configured to cause a processor to perform operations of the embodiment methods summarized above. Further embodiments include a computing device including means for performing functions of the embodiment methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIG. 2 is a flow diagram illustrating a method performed by a real time event management server to configure a data store (e.g., crumb warehouse) for tracking and auditing real time events across different software development tools in an Agile development environment according to some embodiments.

FIG. 3 is a schematic diagram illustrating a set of defined data fields of an event metadata record (e.g., crumb) that enables the records to be linked across various tools and events throughout the end-to-end lifecycle of a software product according to some embodiments.

DETAILED DESCRIPTION

Figure 1:
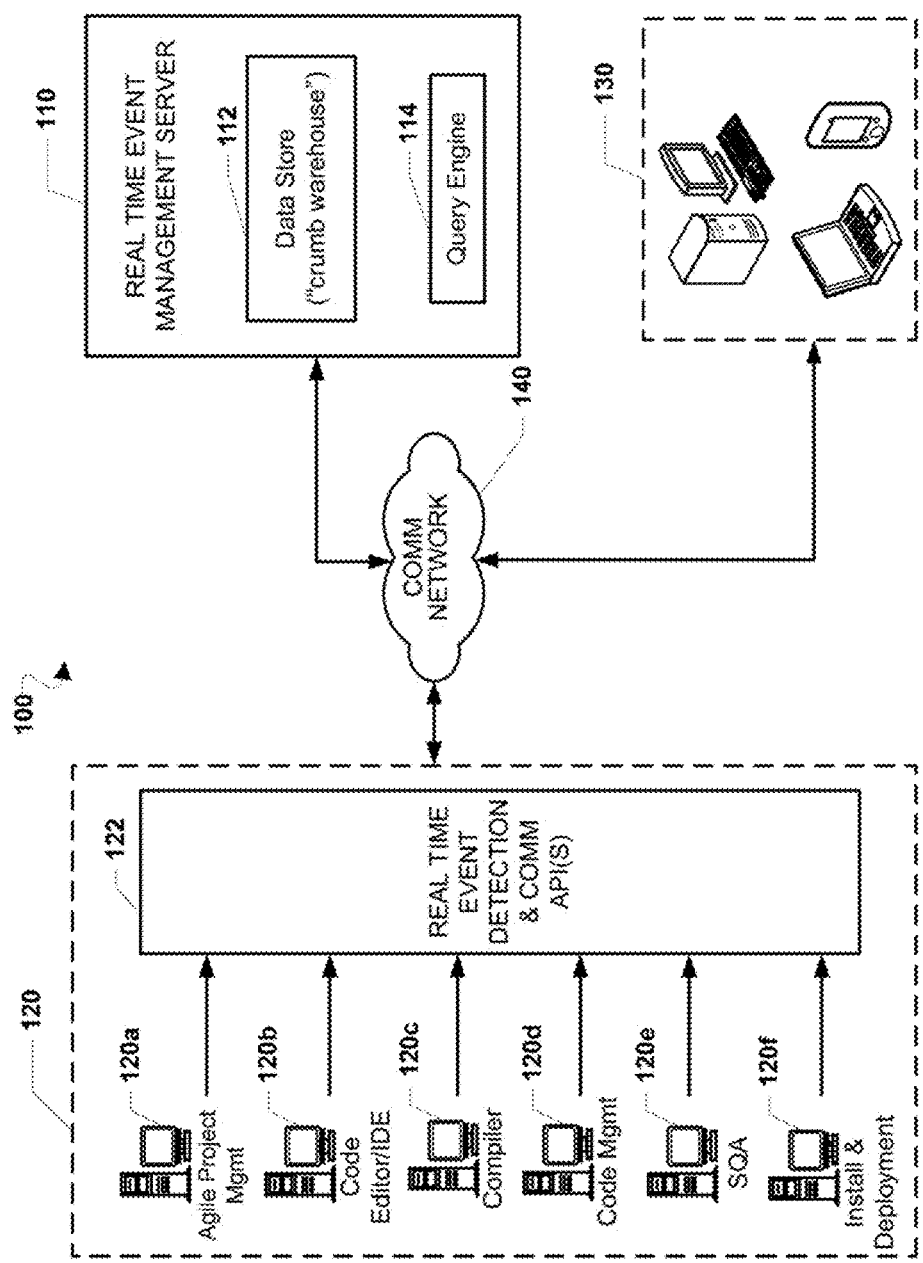
FIG. 1 is a schematic diagram illustrating elements of a networked computer system for tracking and auditing real time events across different software development tools in an Agile development environment according to some embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the term "computing device" refers to an electronic device equipped with at least a processor to perform operations of the various embodiments. In various embodiments, computing devices may be configured with memory and/or storage as well as wireless communication capabilities, such as network transceiver(s) and antenna(s) configured to establish a wide area network (WAN) connection (e.g., a cellular network connection, etc.) and/or a local area network (LAN) connection (e.g., a wireless connection to the Internet via a Wi-Fi™ router, etc.). Examples of computing devices may include personal computers, servers, and wireless communication devices (e.g., cellular telephones, wearable devices, smart-phones, web-pads, tablet computers, Internet enabled cellular telephones, Wi-Fi™ enabled electronic devices, personal data assistants (PDA's), laptop computers, etc.).

The term "compiled code" as used herein refers to a computer file that contains a sequence of bytes that are intended to be interpreted as something other than text characters. Examples of a binary file may include a compiled computer program (or portions thereof), such as an object code file or an executable file.

The terms "software development tool," "software tool," or "tool," as used herein refers to any open source or proprietary executable tool, application, process, script and/or service executing on a computing device that may be utilized during an end-to-end lifecycle of a software product, including but not limited to software development tools used in the design, development, build, quality review, installation, deployment, or maintenance of the software product. Examples of existing software development tools may include, but are not limited to, Jira™ Rally™, IBM Rational Team Concert (RTC)™, HP Quality Center (HP-QC)™ Zephyr™, Microsoft TFS™, TestRail™, Clear Case™, Service Manager™, Project Team™, CMDB™, Sonar™ PPMC™, Fitness™ Cucumber™ GitHub™ Jenkins™, Evolven™, Clarity™, Visio™, Crucible™, Bit Bucket™, uDeploy™ Slack™, COGCoG™, and HipChat™.

The terms "data store" or "crumb warehouse" as used herein refers to a database, network-based storage, cloud storage, a storage cluster, a block chain, log file, or other storage device that may be accessible directly or indirectly, e.g., over a public or private communication network.

Tracking code changes (e.g., what the changes are, who made the changes, and why such changes were made) has always been a difficult task in the software development process. Often it is not clear whether a code change made it into a build, whether such code change was compiled, or if the code change is associated with a defect (e.g., bug). As software development and business processes move to towards Agile software development techniques and shorter cycle times (e.g., sprints), it may be useful to track these changes and know when, in what environments, and/or in what tool you can access information on the change.

Various embodiments are disclosed to configure a data store for tracking and auditing real time events associated with an end-to-end development lifecycle of a software product across different types of software development tools in an Agile development environment. In various embodiments, the data store may be configured to store a vast number of records (e.g., cookies, crumbs, etc.) containing metadata that describe different types of real time events using different types of tools with high granularity (i.e., high level of detail). For example, one or more records may reflect a change (e.g., add or update) with each progression or move of the code, file, image, or event tracker of a function or process. In some embodiments, a record may contain metadata including details for real time events, including but not limited to opening an Agile project in a project management tool, defining requirements for the project in a document editor, searching for existing code in a code repository, writing or editing code in an integrated development environment (IDE), compiling code using a compiler, testing code using an automated tester, tracking defects (i.e., bugs) in a software quality assurance (SQA) tracker, reviewing the code using a code review tool, installing and deploying the code, maintaining the code, etc. Various embodiments may be particularly useful for tracking and auditing the progress of an end-to-end development lifecycle of a software product or any component or capability thereof (e.g., from inception to deployment and maintenance).

In various embodiments, although the records may contain metadata for different types of events using different tools, each record may include a set of defined fields that enable the records to be linked across the various tools and events throughout the end-to-end development lifecycle of a software product. For example, in some embodiments, the set of defined fields may include an Agile product descriptor field for determining records that are linked to a particular Agile product descriptor, such as a specific task, user story, feature, epic, portfolio, or any combination thereof for example. In some embodiments, the set of defined fields may also include additional fields for determining records that may be linked to a particular Agile product descriptor. For example, the additional fields may include a timestamp field, a system identifier (ID) field, an event ID field, a user ID field, a defect ID field, an asset ID field, a multimedia field, a free field, or any combination thereof. Other data fields may also be defined in the records. Thus, in some embodiments, a record that may not be explicitly linked to any Agile product descriptor (e.g., contains a null or no value in the Agile product descriptor field) may be still be linked to an Agile product descriptor based on the values of one or more of the additional fields.

Various embodiments for configuring a data store to track and audit real time events associated with an end-to-end development lifecycle of a software product that includes detecting a compilation event in a compiler and compiling source code, such that event metadata defining the compilation event may be embedded in the compiled code as text. In some embodiments, the text may be clear plain text. In some embodiments, the text may be encrypted text. Thereafter, the embedded event metadata may be extracted from the compiled code and stored as an event metadata record (e.g., crumb) in order to enable the software development of a software product to be tracked even after the product is compiled into a binary form.

FIG. 1 is a schematic diagram illustrating elements of a networked computer system 100 for tracking and auditing real time events across different software development tools in an Agile development environment according to some embodiments. As shown, the networked computer system 100 may include a real time event management server 110, multiple software development tools 120, and one or more client computing devices 130 interconnected over a communication network 140.

The software development tools 120 may include different types of software development tools used in Agile development environments. Examples of the different types may include, but are not limited to, Agile project management tools 120a (e.g., Jira™), code editing and/or integrated development environment (IDE) tools 120b (e.g., Microsoft™ VisualStudio™), compilers 120c (e.g., gcc compiler), code management tools 120d (e.g., ClearCase™), software quality assurance (SQA) tools 120e (e.g., HP™ Quality Center), and install/deployment tools 120f (e.g., uDeploy™). In some embodiments, further types of software development tools may include, such as code review tools, chat and other group collaboration tools (e.g., Slack™), etc.

Each of the software development tools 120a . . . 120f may include a processor configured to execute a real time event detection and communication application programming interface (API) 122 that performs various operations, including, but not limited to, detecting real time events occurring in the tool 120a . . . 120f, obtaining metadata that define the real time events, and transmitting the obtained event metadata over the communication network 140 to the real time event management server 110. In some embodiments, the API 122 may be plug-in software or a software extension that may be integrated into an existing tool. In some embodiments, the underlying code of an existing software development tool, such as open source code, may be modified to incorporate the API 122 into the tool. In some embodiments, particularly where a software development tool cannot be modified, the real-time event management server 110 may be configured to execute a software service or program that analyzes log files received (e.g., pushed or pulled) from each of the software development tools 120a . . . 120f in order to obtain the metadata associated real time events occurring in the tool 120a . . . 120f.

A real time event detected in a software development tool may include any manual action performed by an operator using the tool, an automated action performed by the tool in response to a trigger (e.g., a rule, a scheduled time, etc.), an alert or other notification. Examples of real time events may include, but are not limited to, opening an Agile project in a project management tool, defining requirements for the project in a document editor, searching for existing code in a code repository, writing or editing code in an integrated development environment (IDE), compiling code using a compiler, testing code using an automated tester, tracking defects (i.e., bugs) in a software quality assurance (SQA) tracker, reviewing the code using a code review tool, installing and deploying the code, maintaining the code, etc. In some embodiments, each of the different types of software development tools used in the Agile environment may detect different types of real time events.

The real time event management server 110 may include a data store 112. In some embodiments, the real time event management server 110 may be configured to obtain the event metadata transmitted over the network 140 from the different software development tools 120 and store the event metadata as event metadata records (e.g., crumbs) in the data store 112. The data store 112 may be configured to store a vast number of records (e.g., crumbs) containing the event metadata that define different types of real time events using different types of tools with high granularity (i.e., high level of detail). Each record of the data store 112 may include a set of defined fields that enable the records to be linked across the various tools and events throughout the end-to-end development lifecycle of a software product.

In some embodiments, the real time event management server 110 may include a query engine 114 that, in response to a data query, determines a linked set of event metadata records across the different software development tools based on the set of fields defined in each record of the data store 112. For example, the set of event metadata records may be linked to a particular Agile product descriptor, such as a specific task, user story, feature, epic, portfolio, or any combination thereof. In some embodiments, the query engine 114 may further process and transmit the linked set of event metadata records for presentation or further processing at one or more client computing devices 130.

In some embodiments, the client computing devices 130 may be any of a variety of computing devices, including but not limited to cellular telephones, smart-phones, web-pads, tablet computers, Internet enabled cellular telephones, wireless local area network (WLAN) enabled electronic devices, laptop computers, personal computers, wearable devices (e.g., Fitbit™), and similar electronic devices equipped with at least a processor and a communication resource to communicate with the real time event management server 110 and/or one or more the software development tools 120. In some embodiments, one or more of the client computing devices 130 may be configured to transmit the data query over the communication network 140 to the query engine 114. In some embodiments, one or more of the client computing devices 130 may be configured to process the event metadata records received from the query engine 114 for presentation via an output device (e.g., display, speaker, etc.). For large data sets of event metadata records, the client computing device may be a data mining tool (e.g., Hadoop™, Dedupe™, etc.).

FIG. 2 is a flow diagram illustrating a method 200 performed by a real time event management server (e.g., 110) to configure a data store (e.g., 112) for tracking and auditing real time events across different software development tools in an Agile development environment according to some embodiments. With reference to FIGS. 1-2, operations of the method 200 may be performed by a processor of the real time event management server 110 of FIG. 1.

In block 210, the processor of the real time event management server (e.g., 110) may obtain event metadata defining real time events from different software development tools (e.g., 120). In some embodiments, the processor may receive event metadata transmitted from each of the different software development tools via a communication network (e.g., 140). In some embodiments, the event metadata may be obtained from the payload of one or more messages received according to a network communication protocol. In some embodiments, the event metadata may be formatted using Extensible Markup Language (XML) or other data format.

For example, during development of a software product (or component thereof) in an Agile environment, the members of the development team may create, update, change, test, build, install, and/or deploy code using any number of different types of software development tools. For example, in an Agile sprint, team members may open a Agile project or task using an Agile project management tool (e.g., Jira™), write a set of requirements or comments regarding the project or task using a document editor (e.g., Google™ Docs), search for existing code using a code repository (e.g., GitHub™ or Bit Bucket™), edit the code using an IDE (e.g., Microsoft™ Visual Studio™), build the code using a compiler (e.g., gcc compiler), test the compiled code using a test automation tool (e.g., Jenkins™ for Continuous Integration), track test cases and bugs using a SQA management tool (e.g., HP™ Quality Center), and review and improve the code using a code review tool (e.g., Sonatype Nexus™). In response to such real time events being detected by a respective real time event detection and communication API (e.g., 122), event metadata defining the events may be transmitted over the communication network (e.g., 140) to the real time event management server (e.g., 110) for storage in the data store (e.g. 112).

In some embodiments, the event metadata obtained from at least one of the different software development tools may include an Agile product descriptor of the software product. For example, the event metadata from Agile-based software development tools may include one or more Agile product descriptors associated with each real time event. An Agile product descriptor may identify a specific software product or one or more components and functionalities thereof. For example, in some embodiments, an Agile product descriptor may identify a specific task, user story, feature, epic, portfolio, or any hierarchical combination thereof. A hierarchical combination of Agile product descriptors may include an identifier of specific portfolio may include further identifiers of one or more epics, which may include further identifiers of one or more features, which may include further identifiers of one or more user stories, which may include further identifiers of one or more tasks. In some embodiments, other labels may be used as Agile product descriptors. In some embodiments, the event metadata obtained from one or more of the different software development tools may not include an Agile product descriptor.

In block 220, the processor of the real time event management server (e.g., 110) may store event metadata records (e.g., crumbs) that include the obtained event metadata in a data store (e.g., crumb warehouse). Each of the stored event metadata records may include one or more data fields to link a set of event metadata records across the different software development tools, such as the set of defined data fields as shown in FIG. 3 for example. In some embodiments, as a record is written to the database, the real time event management server (e.g., 110) may automatically adjust the set of defined fields for that record (i.e., the format of the record) based on an identifier of the tool from which the event metadata was obtained. One or more fields may be added or removed from the record based on a tool identifier included in the event metadata. For example, the server (e.g., 110) may add tool-specific fields for the purpose of providing more detailed information and remove fields that are not relevant to the operation of a tool.

FIG. 3 is a schematic diagram illustrating a set of defined data fields of an event metadata record (e.g., crumb) 300 that enable records to be linked across various tools and events throughout the end-to-end lifecycle of a software product according to some embodiments. In some embodiments, the set of defined fields may include a primary key field 310, an Agile product descriptor field 312, a timestamp field 314, a system ID field 316, an event ID field 318, a defect ID field 320, a user ID field 322, an asset ID field 324, multimedia field 326, and a free field 328.

In some embodiments, the primary key field 310 may be configured to store an alphanumeric value that uniquely identifies each record in the data store (e.g., 112). In some embodiments, the value of the primary key field 310 may be incremented for each record as the record is added to the data store.

In some embodiments, the Agile product descriptor field 312 may be configured to store an Agile product descriptor associated with the real time event (e.g., one or more Agile identifiers of an epic, feature, user story, task, etc.). In some embodiments, such as where the event metadata obtained from a tool does not include an Agile product descriptor, the Agile product descriptor field 312 may contain data that represents a null or no value.

In some embodiments, the timestamp field 314 may be configured to store a numeric value that represents the date and time associated with the real time event. For example, a first portion of the numeric value may correspond to the date and a second portion of the numeric value may correspond to the time.

In some embodiments, the system ID field 316 may be configured to store an alphanumeric value that identifies one of the different types of software development tools (e.g., tool identifier) in which the real time event is detected and from which the event metadata is received. In some embodiments, the system ID field 316 may also identify a network address of the computing device that hosts the tool.

In some embodiments, the event ID field 318 may be configured to store an alphanumeric value that identifies the detected real time event. For example, the value stored in the event ID field 318 may identify a manual action performed by an operator using the tool, an automated action performed by the tool in response to a trigger (e.g., a rule, a scheduled time, etc.), an alert or other notification. For example, in some embodiments, where the tool is a code editor/IDE (e.g., 120b), the event ID field 318 may include a value that indicates an user action (e.g., add_code, delete_code, comment_code, etc.).

In some embodiments, the defect ID field 320 may be configured to store an alphanumeric value that assigned to a defect (e.g., bug) in a software quality assurance (SQA) case management tool (e.g., HP-QC). In some embodiments, the defect ID field 320 may be configured to store an assigned defect number, bug identifier and/or type, for example.

In some embodiments, the user ID field 322 may be configured to store an alphanumeric value assigned to a user or human operator that is signed onto the tool identified in the system ID field 316 at the time of the real time event. In some embodiments, the value stored in the user ID field 322 may be a user identifier associated with one or more members of a Agile scrum team.

In some embodiments, the asset ID field 324 may be configured to store an alphanumeric value that may be assigned to software product by an IT asset management (ITAM) tool. In some embodiments, the value stored in the asset ID field 324 may be used to tie one or more software products as a single asset.

In some embodiments, the multimedia field 326 may be configured to store multimedia data, such as images (e.g., screen shots, smart-phone captured photos of handwritten notes, etc.), audio or video recordings (e.g., recordings of group status meetings), or a uniform resource locator (URL) to such multimedia data.

In some embodiments, the free field 328 may be configured to store any type of tool-specific data associated with the real time event. For example, the free field 328 may be a variable field configured with a size for storing large amounts of arbitrary data (e.g., 1K to 2K bytes). For example, in some embodiments, the free field 328 may be used to store file names, lines of code, text messages, error messages, comments, detailed information regarding the defect identified in the defect ID field 320, etc. In some embodiments, the free field data may be spread across multiple event metadata records that correspond to the same real time event. For example, changed blocks of code entered using the code editor/IDE (e.g., 120b) may be stored across the free fields of more than one event metadata record. In some embodiments, the free field data may be used to store a uniform resource locator (URL) that points to another server or storage device that stores a large amount of data related to a case or issue. In some embodiments, the data stored in the free field 328 may be processed and analyzed using various data mining tools (e.g., Hadoop™, Dedupe™, etc.). For example, the free field 328 of a number of event metadata records may be used to identify trends in changes to the code or re-occurring errors.

Figure 4:
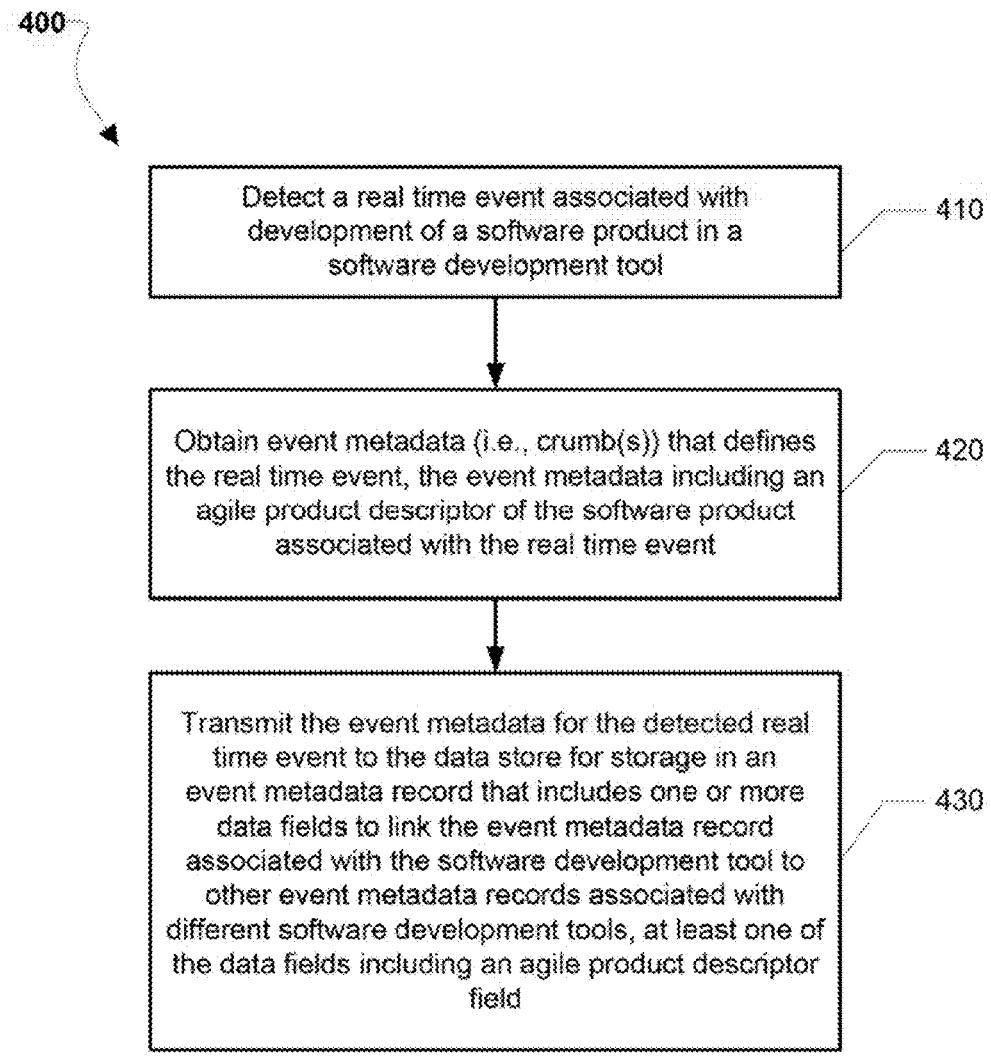
FIG. 4 is a flow diagram illustrating a method performed by a software development tool to configure a data store for tracking and auditing real time events across different software development tools in an Agile development environment according to some embodiments.

FIG. 4 is a flow diagram illustrating a method performed by a software development tool to configure a data store for tracking and auditing real time events across different software development tools in an Agile development environment according to some embodiments. With reference to FIGS. 1-4, operations of the method 400 may be performed by a respective processor of each of the software development tools (e.g., 120 of FIG. 1) executing a real time event detection and communication API (e.g., 122).

In block 410, the processor of a software development tool (e.g., 120a . . . 120f) executing a real time event detection and communication API (e.g., 122) may detect a real time event associated with development of a software product in the software development tool. In some embodiments, the processor may use the API (e.g., 122) to register with the software development tool (e.g., 120a . . . 120f) to receive a real time event notification whenever a specific event or event type occurs in the tool. In some embodiments, the processor may use the API (e.g., 122) to periodically poll a log file associated with the software development tool to detect real time events that occur in the tool. Examples of real time events may include, but are not limited to, start and stop times of a video call for a morning standup in a video conferencing tool, closing of a bug in a SQA management tool (e.g., HP QC™), a message notification for a scheduled start time of a compile job via a collaboration tool (e.g., Slack™), receipt of an update from a wearable device (e.g., Fitbit™) indicating a user's monitored health (e.g., heart rate, sleep, etc.) that may be posted via a collaboration tool.

In block 420, the processor of the software development tool (e.g., 120a . . . 120f) may obtain event metadata that defines the real time event. In some embodiments, the processor may use the real time event detection and communication API (e.g., 122) to access a log file associated with the software development tool to obtain the event metadata for the detected real time event. In some embodiments, the processor may use the API (e.g., 122) to request the event metadata defining the real time event from the software development tool. In some embodiments, the event metadata may include an Agile product descriptor of the software product associated with the real time event. In some embodiments, the event metadata may include, but is not limited to, product codes, product names, event timestamps, detailed information associated with the real time event, or any combination thereof. In some embodiments, the event metadata may include predefined codes or identification numbers to represent specific types of information (e.g., Agile product descriptor, system IDs, issue or case IDs, bug IDs, event IDs, user IDs, asset IDs, trending labels to connect otherwise disconnected events, etc.), such that network traffic may be reduced during transmission of the event metadata.

In block 430, the processor of the software development tool (e.g., 120a . . . 120f) may transmit the event metadata for the detected real time event to a real time event management server (e.g., 110 of FIG. 1) for storage in a data store (e.g., 112). For example, in some embodiments, the event metadata may be transmitted for storage in an event metadata record (e.g., 300 of FIG. 3) that includes one or more data fields used to link the event metadata record associated with the software development tool to other event metadata records associated with different software development tools. In some embodiments, at least one of the data fields may include an Agile product descriptor field. In some embodiments, the event metadata may be transmitted in the payload of one or more messages according to a network communication protocol. In some embodiments, the event metadata may be formatted using Extensible Markup Language (XML) or other data format.

Figure 5A:
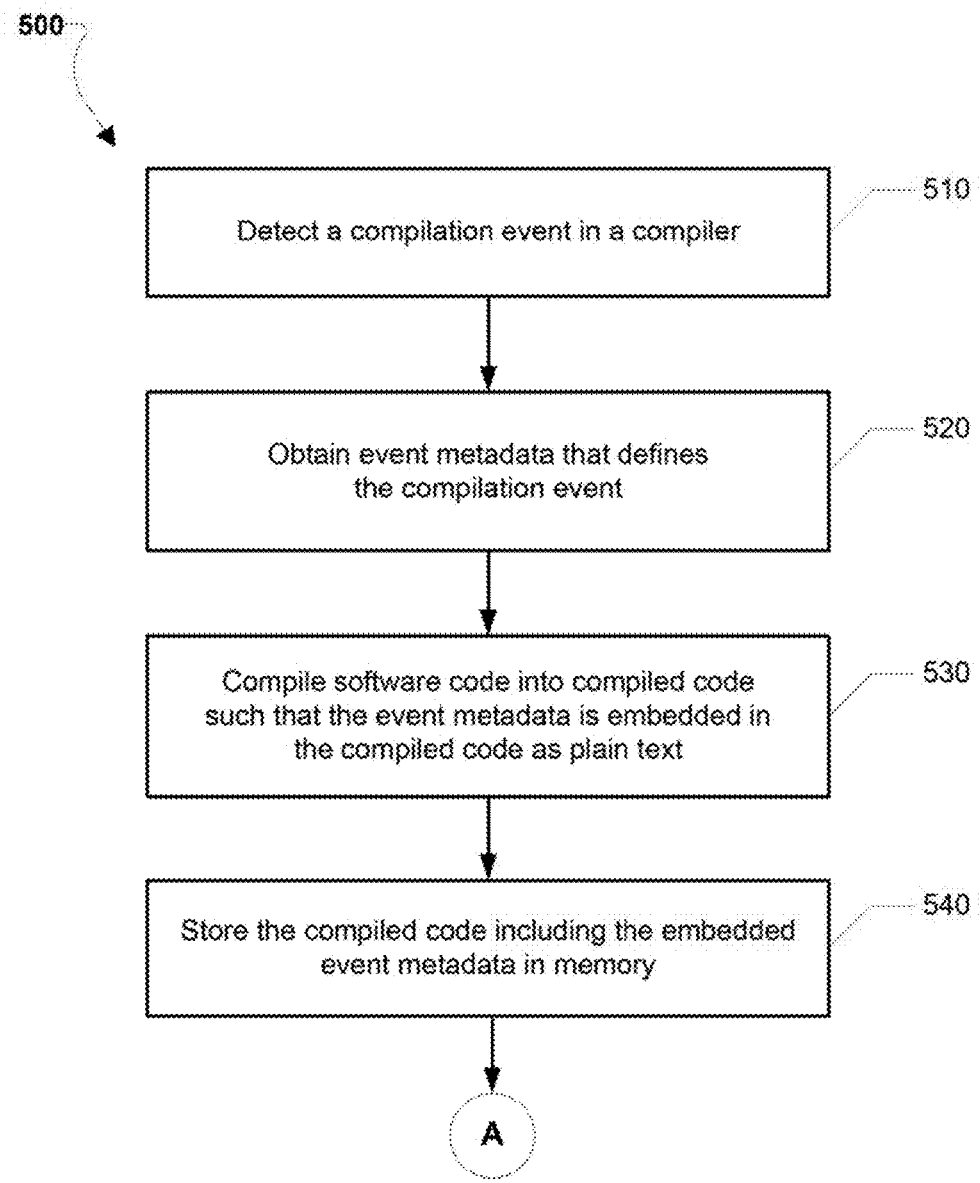
FIGS. 5A and 5B are flow diagrams illustrating a method performed by a compiler to configure a data store for tracking and auditing compilation events in an Agile development environment according to some embodiments.
Figure 5B:
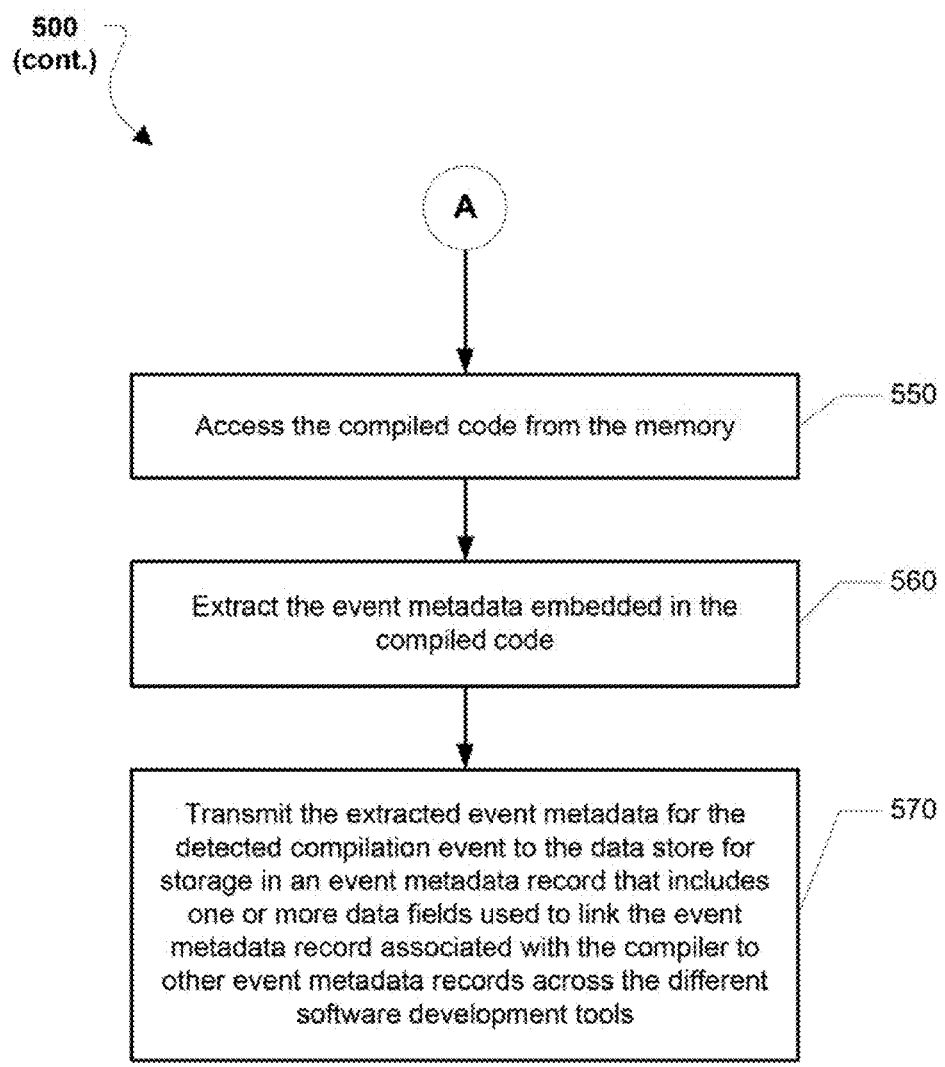

FIGS. 5A and 5B are flow diagrams illustrating a method 500 performed by a compiler to configure a data store (e.g., 112 of FIG. 1) for tracking and auditing compilation events in an Agile development environment according to some embodiments. With reference to FIGS. 1-5B, operations of the method 500 may be performed by a processor of a compiler (e.g., 120c of FIG. 1) executing a real time event detection and communication API (e.g., 122). In this way, event metadata may be captured during the software development process even after the software product is compiled into a machine readable, binary form.

In block 510, the processor of a compiler (e.g., 120c) may detect a compilation event in the compiler (e.g., 120c). In some embodiments, the processor may use the real time event detection and communication API (e.g., 122) to detect when the compiler receives a compile command to transform source code written in a program language into another computer language (i.e., target language), resulting in compiled code. In some embodiments, the API (e.g., 122) may be configured to intercept the compile command before sending the command to the compiler for processing.

In block 520, the processor of the compiler (e.g., 120c) may obtain event metadata that defines the compilation event. In some embodiments, the event metadata may include, but not limited to, one or more source code files selected to compile, any options or settings specified for the compilation, one or more identifiers of the source language and the target language, an identifier of the compiler (e.g., gcc, Open64, etc.), compiler type (e.g., single pass, multipass, cross, optimizing, etc.), network address of computer device hosting compiler (e.g. TCP/IP address), time date stamp, location of compiled code (e.g., VOB, cloud or local storage, etc.), for example.

In some embodiments, the processor may use the real time event detection and communication API (e.g., 122) to access a log file associated with the compiler to obtain the event metadata for the detected real time event prior to compiling the source code. In some embodiments, the processor may use the API (e.g., 122) to request the event metadata defining the compilation event from the compiler prior to compiling the source code. In some embodiments, particularly where the compiler supports Agile frameworks, the event metadata may also include an Agile product descriptor associated with the compilation event. In some embodiments, the event metadata may not include an Agile product descriptor.

In block 530, the processor of the compiler (e.g., 120c) may compile software code into compiled code such that the event metadata is embedded in the compiled code as text. In some embodiments, the compiled code may include a computer file in binary form that contains a sequence of bytes that are intended to be interpreted as something other than text characters in a first portion and the event metadata embedded as a sequence of bytes that are intended to be interpreted as text (e.g., ASCII characters) in a second portion. In some embodiments, the text may be embedded as human-readable, plain text. In some embodiments, the text may be embedded as encrypted text.

In block 540, the processor of the compiler (e.g., 120c) may store the compiled code including the embedded event metadata in memory. In some embodiments, the compiled code may be stored in a temporary cache memory associated with the compiler or in data storage associated with an electronic file management computer system.

In block 550, the compiled code may be accessed from the memory. In some embodiments, the compiled code may be accessed by the processor of the compiler (e.g., 120c). In some embodiments, the compiled code may be accessed by a processor of the real time event management server (e.g., 110 of FIG. 1). For example, in some embodiments, the real time event management server may be authorized to periodically access batches of compiled code generated by a compiler (e.g., 120c) that are stored in an electronic file management computer system. For example, in some embodiments, the server (e.g., 110) may proactively scan a versioned object base (VOB) or other data store of compiled code for newly compiled code files or versions, e.g., by reading the datestamp from the compiled file database.

In block 560, the event metadata embedded in the compiled code may be extracted. In some embodiments, the compiled code may be accessed by the processor of the compiler (e.g., 120c). In some embodiments, the compiled code may be accessed by a processor of the real time event management server (e.g., 110 of FIG. 1). In some embodiments, the embedded event metadata may be extracted from the compiled code by executing a program, script, or other command that finds and extracts text strings embedded in compiled code. For example, "strings" is a program available in some Unix™, Linux™, and iOS™ operating systems that may be used to extract the embedded event metadata from the compiled code. In some embodiments, the event metadata embedded in the compiled code may be embedded in a specific format (e.g., XML) that enables the event metadata may be distinguished and filtered out from other plain text embedded in the compiled code.

In block 570, the processor of the compiler (e.g., 120) may transmit the extracted event metadata for the detected compilation event to a real time event management server (e.g., 110 of FIG. 1) for storage in a data store (e.g., 112). In some embodiments, the event metadata may be transmitted for storage in an event metadata record that includes one or more data fields used to link the event metadata record associated with the software development tool to other event metadata records associated with different software development tools. In some embodiments, at least one of the data fields may include an Agile product descriptor field. In some embodiments, the event metadata may be transmitted in the payload of one or more messages according to a network communication protocol. In some embodiments, the event metadata may be formatted using Extensible Markup Language (XML) or other data format. In some embodiments, block 570 may be optional, such as where the real time event management server accesses the compiled code from memory (i.e., block 550) and extracts the event metadata embedded in the compiled code (i.e., block 560).

Figure 6:
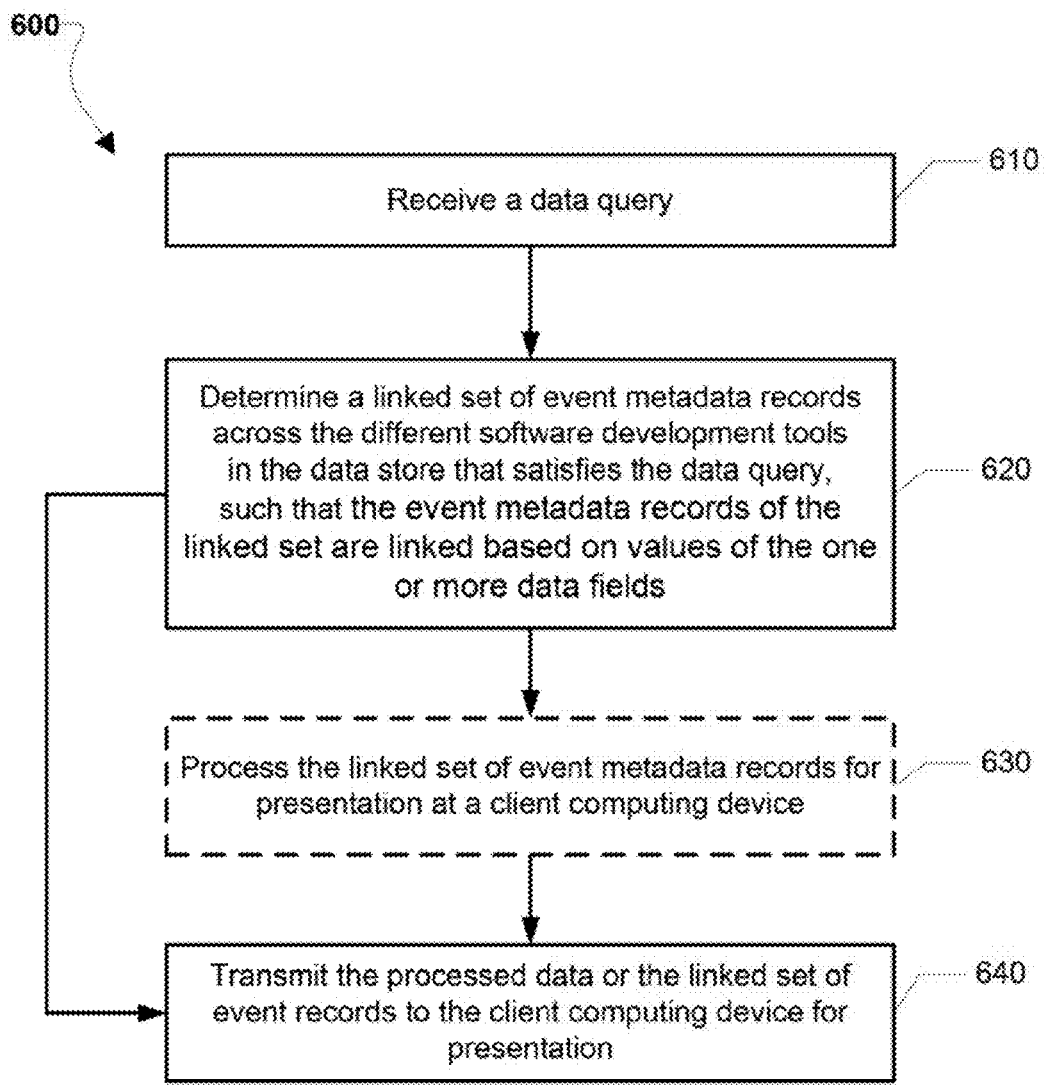
FIG. 6 is a flow diagram illustrating a method performed by a real time event management server using the event data records (i.e., crumbs) stored in the data store to audit real time events across different software development tools in an Agile development environment according to some embodiments.

FIG. 6 is a flow diagram illustrating a method performed by a real time event management server using the event data records (e.g., crumbs) stored in the data store to audit real time events across different software development tools in an Agile development environment according to some embodiments. With reference to FIGS. 1-6, operations of the method 600 may be performed by a processor of a real time event management server (e.g., 110 of FIG. 1) executing a query engine (e.g., 114).

In block 610, the processor executing the query engine 114 may receive a data query. In some embodiments, the query engine 114 is a search engine and the data query is a search query received over a network (e.g., 140) from a client computing device (e.g., 130). In some embodiments, the query engine 114 is a subscription engine and the data query is a pre-defined query stored in a memory of the server 110 that may be subscribed to by one or more users. In some embodiments, the data query may be automatically generated using machine learning based on historical data. For example, if an operator (e.g., a supervisory or administrator) regularly submits the same data query during a particular timeframe using one of the computing devices (e.g., 130 of FIG. 1), the query engine 114 may create a rule to automatically execute that data query during that timeframe.

In some embodiments, the data query may request information regarding the end-to-end development lifecycle of a software product (e.g. from inception to installation). In some embodiments, the software product may be identified in the data query using a high level Agile product descriptor, such as an epic or a portfolio. For example, the data query may request all event metadata records relating to the creation, update, change, test, build, installation, and/or deployment of code using any number of different types of software development tools.

In some embodiments, the data query may request information regarding the end-to-end development lifecycle of a particular component or functionality of a software product. In some embodiments, the software component or functionality may be identified in the data query using a lower level Agile product descriptor, such as a specific feature or user story. For example, the data query may request all event metadata records relating to the creation, update, change, test, build, installation, and/or deployment of code corresponding to that feature or user story using any number of different types of software development tools.

In some embodiments, the data query may request a search for specific information, such as the status of a software product or component thereof. For example, the event metadata records may be used to determine which component or functionality (e.g., features) of the product are in development by users (e.g., Scrum Team Y) during a specific time period (e.g., two-week sprint N).

In some embodiments, the data query may request all event metadata records (e.g., crumbs) linked to a particular defect ID (e.g., bug ID) assigned by an SQA tool (e.g. 120e).

In some embodiments, the data query may request event metadata records associated with a particular software development tool or event metadata records associated with a tool that has been reporting a significant amount of event metadata over a recent time period, indicting an uptick in usage of that tool by members of one or more Agile teams. For example, resulting usage data may indicate the extent to which certain tools are being used during Agile product development.

In block 620, the processor executing the query engine 114 may determine a linked set of event metadata records across the different software development tools in the data store that satisfies the data query, such that the event metadata records of the linked set are linked based on values of the one or more fields.

In some embodiments, for example, where the data query requests information relating to a specific Agile product descriptor, e.g., a specific user story identifier, the query engine 114 may search the event metadata records (e.g., 300) to identify a linked set of event metadata records that include a matching user story identifier in the Agile product descriptor field (e.g., 312 of FIG. 3). In some embodiments, some of the event metadata records may not include an Agile product descriptor (e.g., contains a null or no value in the Agile product descriptor field). Thus, the query engine 114 may use one or more additional fields of such event metadata records to determine whether the record is linked to the requested Agile product descriptor (e.g., specific user story identifier).

For example, in some embodiments, the values stored in the timestamp field (e.g., 314), the system ID field (e.g., 316), the event ID field (e.g., 318), and/or the user ID field (e.g., 322) of such candidate event metadata records may be compared to corresponding fields in the set of event metadata records matching the requested Agile product descriptor ("matching event metadata records"). In some embodiments, the oldest and newest timestamps of the matching event metadata records may be used to define a time range associated with the requested Agile product descriptor for filtering out one or more of the candidate event metadata records outside the time range. For the remaining candidate event metadata records within the defined time range, the values of the timestamp field (e.g., 314), the system ID field (e.g., 316) and the event ID field (e.g., 318) may be compared the respective fields of the matching event metadata records. For example, assuming that the remaining candidate records are associated with compiler (e.g. 120*c*) that occurs after one or more matching event metadata records associated with a code editor/IDE (e.g., 120*b*), the remaining candidate event metadata records may be added to the linked set of matching event metadata records. In some embodiments, the user ID field (e.g., 322) of the remaining candidate event metadata records may be used to determine whether a record is linked to the requested Agile product descriptor (e.g., specific user story identifier). For example, one or more of the matching event metadata records may identify the user IDs of team members that are assigned to work on the requested user story. Assuming that the value of user ID field (e.g., 322) of the remaining candidate metadata records match the user IDs included in the matching event metadata records, the remaining candidate metadata records may also be added to the linked set of matching event metadata records.

In optional block 630, the processor executing the query engine 114 may process the linked set of event metadata records for presentation at one or more client computing devices (e.g., 130 of FIG. 1). For example, in some embodiments, the processor may process the linked set of event metadata records for presentation through an output device (e.g., display) of the one or more client computing devices in the form of a graphical dashboard. In some embodiments, the graphical dashboard may be configured to enable a user to drill down graphically to lower levels (e.g., epic, feature, user story, and/or task levels). In some embodiments, the graphical dashboard may be configured to use colored icons to distinguish event metadata records at hierarchically different Agile product descriptor levels and event metadata records within a same level. In some embodiments, the event metadata records may be visually represented by a graphical timeline at any of the Agile product descriptor levels. In some embodiments, various packaged visual presentation software may be linked to the data. In some embodiments, an existing project management tool (e.g., AgileCraft™) may be modified to read the data and present a coherent dashboard interface for display to a user. In some embodiments, the data may be exported into a defined format, such that the data records may be presented in various forms using existing data analytics tools (e.g., Excel™ Tableau™, etc.)

In some embodiments, the processor executing the query engine 114 may be configured to employ artificial intelligence (AI) for faster processing as well as better results. For example, in some embodiments, the query engine 114 may be configured to implement an AI-based default reasoning process to process a query against the data store 112 (e.g., crumb warehouse), such as a qualification request to determine whether users of the software development tools 120 are performing their tasks in an efficient manner for example. In some embodiments, the query engine 114 may be configured to implement an AI-based process for project planning purposes. For example, in some embodiments, the query engine 114 may use an AI-based analytical process that analyzes a particular data set of event metadata records to determine whether a particular Agile project is maximizing utility of the Agile team, the individual team members, tools and/or other available resources. The results of such applied AI processes may be fed back via a dashboard interface or other reporting mechanism to enable data to be provided back to users and managers with pointers or hints for improvements to maximize such utility. In some embodiments, the processor executing the query engine 114 may be a graphics processing unit (GPU) that supports AI processes, thus enabling faster, parallelized neural network training and processing.

In some embodiments, the processor executing the query engine 114 may process the linked set of event metadata records to determine relationships between a user's health (e.g., stress, lack of sleep, etc.) and the quality of the user's work product (i.e., bug-free code). For example, in some embodiments, a linked set of event metadata records may be obtained for a specific Agile team member by their user id. The linked set of event metadata records may include event metadata from a health monitoring application on a wearable device (e.g., Fitbit™) that indicates the user's heart rate and sleep trends over the course of a particular development cycle. The linked set of event metadata records may also include event metadata associated with work performed by that user during the development cycle (e.g., code development). Thus, by analyzing the linked set of records corresponding to a user's health and work during the development cycle, the query engine may be able to determine whether the user's health affected or may affect the quality and/or velocity of Agile product development. For example, where the event metadata records indicate a decline in the user's health during the development cycle, the query engine (e.g., 114) may issue a warning or other notification (e.g., email to user's supervisor) indicating that a risk of defective code from that user.

In some embodiments, the event metadata obtained from a wearable device (e.g., FitBit) may be useful in authenticating an Agile team member. For example, where the event metadata records from a user's wearable device indicate a significant deviation in the user's biometrics (e.g., fingerprint, heart rate, etc.), the query engine (e.g., 114) may issue an warning or alert that work performed the user (code writing, compiling, and/or testing) may have been performed by an unauthorized person with access to the user's wearable device and user credential information (e.g., user ID, password, etc.).

In block 640, the processor may transmit the processed data or the linked set of event records to the one or more client computing devices (e.g., 130) for presentation. In some embodiments, the processed data or the linked set of event records may be transmitted to one or more of the client computing device (e.g., 130) that issued the data query through a search engine or other data mining tool. For example, the processed data may be presented to the user via a display of the client computing device in the form of a graphical dashboard, e.g., a dashboard displaying work performed by a specific individual for a period of time, starting with metadata from event records corresponding to stories opened in a project management tool (e.g. Jira™) and concluding with metadata from event records corresponding to software installed using a software installation and deployment tool (e.g., uDeploy™).

In some embodiments, the processed data or the linked set of event records may be transmitted to a subscription engine that may forward the data to individuals via various communication services, including but not limited to text, email, phone, Twitter™, Tumblr™, Facebook™, Facebook At Work™Google+™, CoG™ LINE™, WeChat™ and/or other social media application. In some embodiments, the processed data or the linked set of event records may be transmitted to update information maintained at one or more software development tools 120 (e.g., Jira™ Rally™ HP™ Quality Center, Zephyr™, Microsoft™ TFS, TestRail™). In some embodiments, such software development tools may be modified to read, process, and act upon the receipt of the event metadata records (e.g., display results and/or status in a meaningful way).

Figure 7:
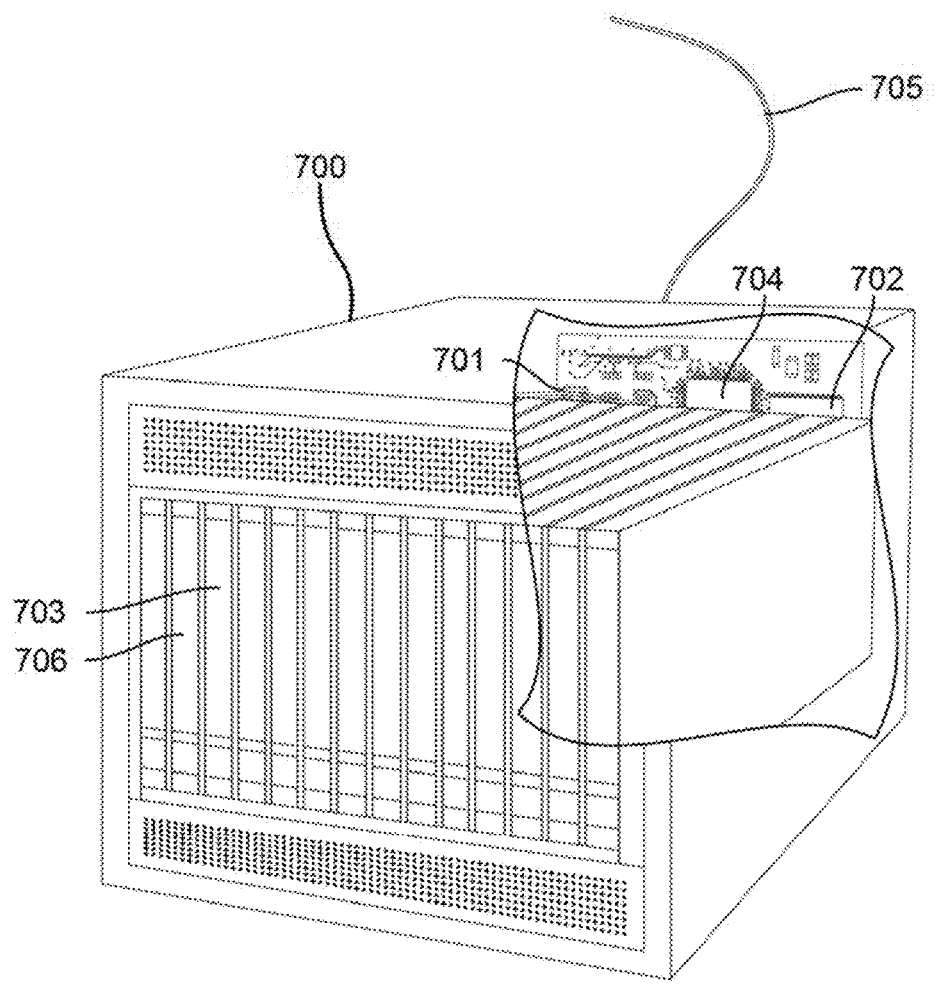
FIG. 7 is a schematic diagram illustrating components of a computing device that may be configured to implement methods according to some embodiments.

The various embodiments may be implemented on any of a variety of commercially available server devices, such as the server 700 illustrated in FIG. 7. Such a server 700 typically includes a processor 701 coupled to volatile memory 702 and a large capacity nonvolatile memory, such as a disk drive 703. The server 700 may also include a floppy disc drive, compact disc (CD) or DVD disc drive 706 coupled to the processor 701. The server 700 may also include network access ports 704 coupled to the processor 701 for establishing data connections with a network 705, such as a local area network coupled to other broadcast system computers and servers. In some embodiments, the server functionality may be provided as a service in a cloud computing service environment, such as Amazon Web Services™ Microsoft Azure™, Rackspace™, Google Cloud™, for example.

The processor 701 may be any programmable microprocessor, microcomputer or multiple processor chip or chips, graphics processing unit (GPU), reduced instruction set computing (RISC) processor, or Advanced RISC Machine (ARM) processor that can be configured by software instructions (applications) to perform a variety of functions, including the functions of the various embodiments described above. In some embodiments, multiple processors may be provided, such as one processor dedicated to wireless communication functions and one processor dedicated to running other applications. Typically, software applications may be stored in the internal memory 702, 703 before they are accessed and loaded into the processor 701. The processor 701 may include internal memory sufficient to store the application software instructions.

Figure 8:
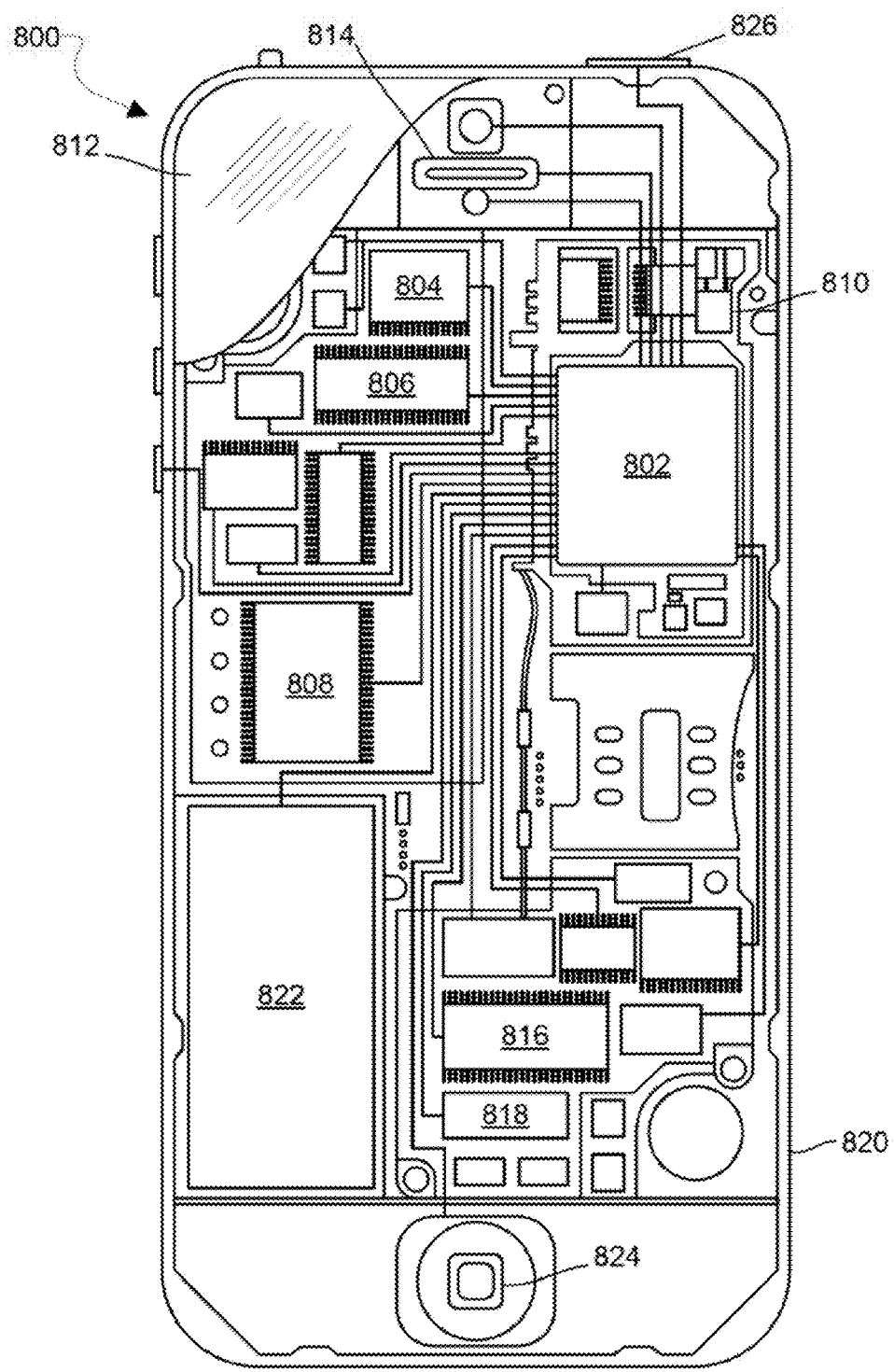
FIG. 8 is a schematic diagram illustrating components of another computing device that may be configured to implement methods according to some embodiments.

FIG. 8 is a system block diagram of a smartphone type mobile communication device 800 suitable for use with various embodiments, including the embodiments of the methods 400 described with reference to FIG. 4. According to various embodiments, the communication device 800 may be similar to the mobile communication devices as described with reference to the client computing devices 130 of FIG. 1.

A mobile communication device 800 may include a processor 802 coupled to a touchscreen controller 804 and an internal memory 806. The processor 802 may be one or more multi-core integrated circuits designated for general or specific processing tasks. In some embodiments, the processor 802 may be any programmable microprocessor, microcomputer, multiple processor chip or chips, graphics processing unit (GPU), reduced instruction set computing (RISC) processor, or Advanced RISC Machine (ARM) processor that can be configured by software instructions (applications) to perform a variety of functions, including the functions of the various embodiments described above. The internal memory 806 may be volatile or non-volatile memory. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the communication device 800 need not have touch screen capability. Additionally, the mobile communication device 800 may include a cellular network transceiver 808 coupled to the processor 802 and to an antenna 804 for sending and receiving electromagnetic radiation that may be connected to a wireless data link. The transceiver 808 and the antenna 810 may be used with the above-mentioned circuitry to implement various embodiment methods. In some embodiments, the transceiver 808 may be configured to communicate data according to various communication protocols and/or radio frequencies, such as WiFi (e.g., IEEE 802.11ac), near field communications (NFC), Bluetooth™, Long Term Evolution (LTE) 5G™, for example.

The mobile communication device 800 may have a cellular network transceiver 808 coupled to the processor 802 and to an antenna 810 and configured for sending and receiving cellular communications. The mobile communication device 800 may include one or more SIM cards 816, 818 coupled to the transceiver 808 and/or the processor 802 and may be configured as described above. In some embodiments, a dual subscriber identity module (SIM) or multi-SIM mobile communication device may be configured to transmit and/or receive data at increased bandwidth rates using radio signaling techniques (e.g., LTE categories, multiple-input and multiple-output (MIMO) for Wi-Fi type signaling).

The mobile communication device 800 may also include speakers 814 for providing audio outputs. The mobile communication device 800 may also include a housing 820, constructed of a plastic, metal, or a combination of materials, for containing all or some of the components discussed herein. The mobile communication device 800 may include a power source 822 coupled to the processor 802, such as a disposable or rechargeable battery. The rechargeable battery may also be coupled to the peripheral device connection port to receive a charging current from a source external to the communication device 800. The communication device 800 may also include a physical button 824 for receiving user inputs. The mobile communication device 800 may also include a power button 826 for turning the mobile communication device 800 on and off.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, graphics processing unit (GPU), reduced instruction set computing (RISC) processor, Advanced RISC Machine (ARM) processor or state machine. A processor may also be implemented as a combination of receiver smart objects, e.g., a combination of a DSP and a microprocessor, a two or more microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, cloud storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of configuring a data store for tracking and auditing real time events across a plurality of different software development tools in an Agile development environment, comprising:
    obtaining, by a processor, event metadata defining the real time events from the plurality of different software development tools, wherein the event metadata obtained from at least one of the plurality of different software development tools comprises an Agile product descriptor of a software product corresponding to each real time event;
    storing, by the processor, event metadata records that include the obtained event metadata in a data store, wherein each of the event metadata records comprises one or more data fields to link a set of event metadata records across the plurality of different software development tools, wherein the one or more data fields comprises an Agile product descriptor field;
    receiving, by the processor, a data query;
    determining, by the processor, a linked set of event metadata records across the plurality of different software development tools in the data store that satisfy the data query, wherein the event metadata records of the linked set are linked based on values of the one or more data fields; and
    transmitting, by the processor, the linked set of event metadata records for presentation at a client computing device.

2. The method of claim 1, wherein the Agile product descriptor field includes one or more identifiers of a task, user story, feature, epic, portfolio, or any combination thereof.

3. The method of claim 1, wherein the one or more data fields used to link the set of event metadata records across the plurality of different software development tools further comprise one or more of a unique record key field, a timestamp field, a system identifier field, an event identifier field, a user identifier field, a defect identifier field, an asset identifier field, a multimedia field, a free field, or any combination thereof.

4. The method of claim 1, wherein the plurality of different software development tools comprises a compiler.

5. The method of claim 1, wherein the event metadata defines a compilation event and wherein obtaining the event metadata defining the real time events from the plurality of different software development tools comprises:
    accessing, by the processor, compiled code stored in memory, wherein the event metadata defining the compilation event is embedded in the compiled code as text; and
    extracting, by the processor, the event metadata embedded in the compiled code.

6. The method of claim 1, wherein the plurality of different software development tools comprises
a coding tool and the event metadata comprises a source code segment generated using the coding tool; and
wherein storing the event metadata records that include the obtained event metadata in the data store comprises storing, by the processor, the code segment in a free field of the event metadata records associated with the coding tool.

7. A method of configuring a data store for tracking and auditing of real time events across a plurality of different software development tools in an Agile development environment, comprising:
detecting, by a processor of a software development tool comprising a compiler, a real time event associated with development of a software product in the software development tool;
obtaining, by the processor, event metadata that defines the real time event, wherein the event metadata further comprises an Agile product descriptor of the software product associated with the real time event;
transmitting, by the processor, the event metadata for the detected real time event to the data store for storage in an event metadata record, wherein the event metadata record comprises one or more data fields to link the event metadata record associated with the software development tool to other event metadata records associated with the plurality of different software development tools, wherein at least one of the data fields comprises an Agile product descriptor field;
detecting, by the processor, a compilation event in the compiler;
obtaining, by the processor, event metadata that defines the compilation event;
compiling, by the processor, source code into compiled code, such that the event metadata is embedded in the compiled code as text;
extracting, by the processor, the event metadata embedded in the compiled code; and
transmitting the extracted event metadata for the detected compilation event to the data store for storage in an event metadata record, wherein the event metadata record comprises one or more data fields used to link the event metadata record associated with the compiler to other event metadata records across the plurality of different software development tools.

8. The method of claim 7, wherein the Agile product descriptor field includes one or more identifiers of a task, user story, feature, epic, portfolio, or any combination thereof.

9. The method of claim 7, wherein the one or more data fields used to link the set of event metadata records across the plurality of different software development tools further comprise one or more of a unique record key field, a timestamp field, an event identifier field, a system identifier field, a user identifier field, a defect number field, an asset identifier field, a multimedia field, a free field, or any combination thereof.

10. A server computing device, comprising:
a processor and a memory configured with processor-executable instructions to:
obtain event metadata defining the real time events from a plurality of different software development tools, wherein the event metadata obtained from at least one of the plurality of different software development tools comprises an Agile product descriptor of a software product corresponding to each real time event;
store event metadata records that include the obtained event metadata in a data store, wherein each of the event metadata records comprises one or more data fields to link a set of event metadata records across the plurality of different software development tools, wherein the one or more data fields comprises an Agile product descriptor field;
receive a data query;
determine a linked set of event metadata records across the plurality of different software development tools in the data store that satisfy the data query, wherein the event metadata records of the linked set are linked based on values of the one or more data fields; and
transmit the linked set of event metadata records for presentation at a client computing device.

11. The server computing device of claim 10, wherein the Agile product descriptor field includes one or more identifiers of a task, user story, feature, epic, portfolio, or any combination thereof.

12. The server computing device of claim 10, wherein the one or more data fields used to link the set of event metadata records across the plurality of different software development tools further comprise one or more of a unique record key field, a timestamp field, a system identifier field, an event identifier field, a user identifier field, a defect identifier field, an asset identifier field, a multimedia field, a free field, or any combination thereof.

13. The server computing device of claim 10, wherein the plurality of different software development tools comprises a compiler.

14. The server computing device of claim 10, wherein the event metadata defines a compilation event and wherein to obtain the event metadata defining the real time events from the plurality of different software development tools, the processor is further configured with processor-executable instructions to:
access compiled code stored in memory, wherein the event metadata defining the compilation event is embedded in the compiled code as text; and
extract the event metadata embedded in the compiled code.

15. The server computing device of claim 10, wherein the plurality of different software development tools comprises
a coding tool and the event metadata comprises a source code segment generated using the coding tool; and
wherein to store the event metadata records that include the obtained event metadata in the data store comprises storing, by the server processor, the code segment in a free field of the event metadata records associated with the coding tool.

16. A computing device implementing a software development tool comprising a compiler, the device comprising:
a processor and a memory configured with processor-executable instructions to:
detect a real time event associated with development of a software product in the software development tool;
obtain event metadata that defines the real time event, wherein the event metadata further comprises an Agile product descriptor of the software product associated with the real time event;
transmit the event metadata for the detected real time event to the data store for storage in an event metadata record, wherein the event metadata record comprises one or more data fields to link the event metadata record associated with the software development tool to other event metadata records associated with a plurality of different software development tools, wherein at least one of the data fields comprises an Agile product descriptor field;
detect a compilation event in the compiler;
obtain event metadata that defines the compilation event;
compile source code into compiled code, such that the event metadata is embedded in the compiled code as text;
extract the event metadata embedded in the compiled code; and
transmit the extracted event metadata for the detected compilation event to the data store for storage in an event metadata record, wherein the event metadata record comprises one or more data fields used to link the event metadata record associated with the compiler to other event metadata records across the plurality of different software development tools.

17. The computing device of claim 16, wherein the Agile product descriptor field includes one or more identifiers of a task, user story, feature, epic, portfolio, or any combination thereof.

18. The computing device of claim 16, wherein the one or more data fields used to link the set of event metadata records across the plurality of different software development tools further comprise one or more of a unique record key field, a timestamp field, an event identifier field, a system identifier field, a user identifier field, a defect number field, an asset identifier field, a multimedia field, a free field, or any combination thereof.

19. A server computing device, comprising:
means for obtaining event metadata defining the real time events from a plurality of different software development tools, wherein the event metadata obtained from at least one of the plurality of different software development tools comprises an Agile product descriptor of a software product corresponding to each real time event;
means for storing event metadata records that include the obtained event metadata in a data store, wherein each of the event metadata records comprises one or more data fields to link a set of event metadata records across the plurality of different software development tools, wherein the one or more data fields comprises an Agile product descriptor field;
means for receiving a data query;
means for determining a linked set of event metadata records across the plurality of different software development tools in the data store that satisfy the data query, wherein the event metadata records of the linked set are linked based on values of the one or more data fields; and
means for transmitting the linked set of event metadata records for presentation at a client computing device.

20. A computing device implementing a software development tool, comprising:
means for detecting a real time event associated with development of a software product in the software development tool;
means for obtaining event metadata that defines the real time event, wherein the event metadata further comprises an Agile product descriptor of the software product associated with the real time event;
means for transmitting the event metadata for the detected real time event to the data store for storage in an event metadata record, wherein the event metadata record comprises one or more data fields to link the event metadata record associated with the software development tool to other event metadata records associated with a plurality of different software development tools, wherein at least one of the data fields comprises an Agile product descriptor field;
means for detecting a compilation event in the compiler;
means for obtaining event metadata that defines the compilation event;
means for compiling, by the processor, source code into compiled code, such that the event metadata is embedded in the compiled code as text;
means for extracting the event metadata embedded in the compiled code; and
means for transmitting the extracted event metadata for the detected compilation event to the data store for storage in an event metadata record, wherein the event metadata record comprises one or more data fields used to link the event metadata record associated with the compiler to other event metadata records across the plurality of different software development tools.

21. A non-transitory processor-readable storage medium having stored thereon processor-exectuable instructions configured to cause a processor of a server computing device to perform operations comprising:
obtaining event metadata defining the real time events from a plurality of different software development tools, wherein the event metadata obtained from at least one of the plurality of different software development tools comprises an Agile product descriptor of a software product corresponding to each real time event;
storing event metadata records that include the obtained event metadata in a data store, wherein each of the event metadata records comprises one or more data fields to link a set of event metadata records across the plurality of different software development tools, wherein the one or more data fields comprises an Agile product descriptor field;
receiving a data query;
determining a linked set of event metadata records across the plurality of different software development tools in the data store that satisfy the data query, wherein the event metadata records of the linked set are linked based on values of the one or more data fields; and
transmitting the linked set of event metadata records for presentation at a client computing device.

22. A non-transitory processor-readable storage medium having stored thereon processor-exectuable instructions configured to cause a processor of a computing device implementing a software development tool to perform operations comprising:
detecting a real time event associated with development of a software product in the software development tool;
obtaining event metadata that defines the real time event, wherein the event metadata further comprises an Agile product descriptor of the software product associated with the real time event; and
transmitting the event metadata for the detected real time event to the data store for storage in an event metadata record, wherein the event metadata record comprises one or more data fields to link the event metadata record associated with the software development tool to other event metadata records associated with a plurality of different software development tools, wherein at least one of the data fields comprises an Agile product descriptor field;

detecting a compilation event in the compiler;

obtaining event metadata that defines the compilation event;

compiling, by the processor, source code into compiled code, such that the event metadata is embedded in the compiled code as text;

extracting the event metadata embedded in the compiled code; and transmitting the extracted event metadata for the detected compilation event to the data store for storage in an event metadata record, wherein the event metadata record comprises one or more data fields used to link the event metadata record associated with the compiler to other event metadata records across the plurality of different software development tools.

\* \* \* \* \*